Figure 1:
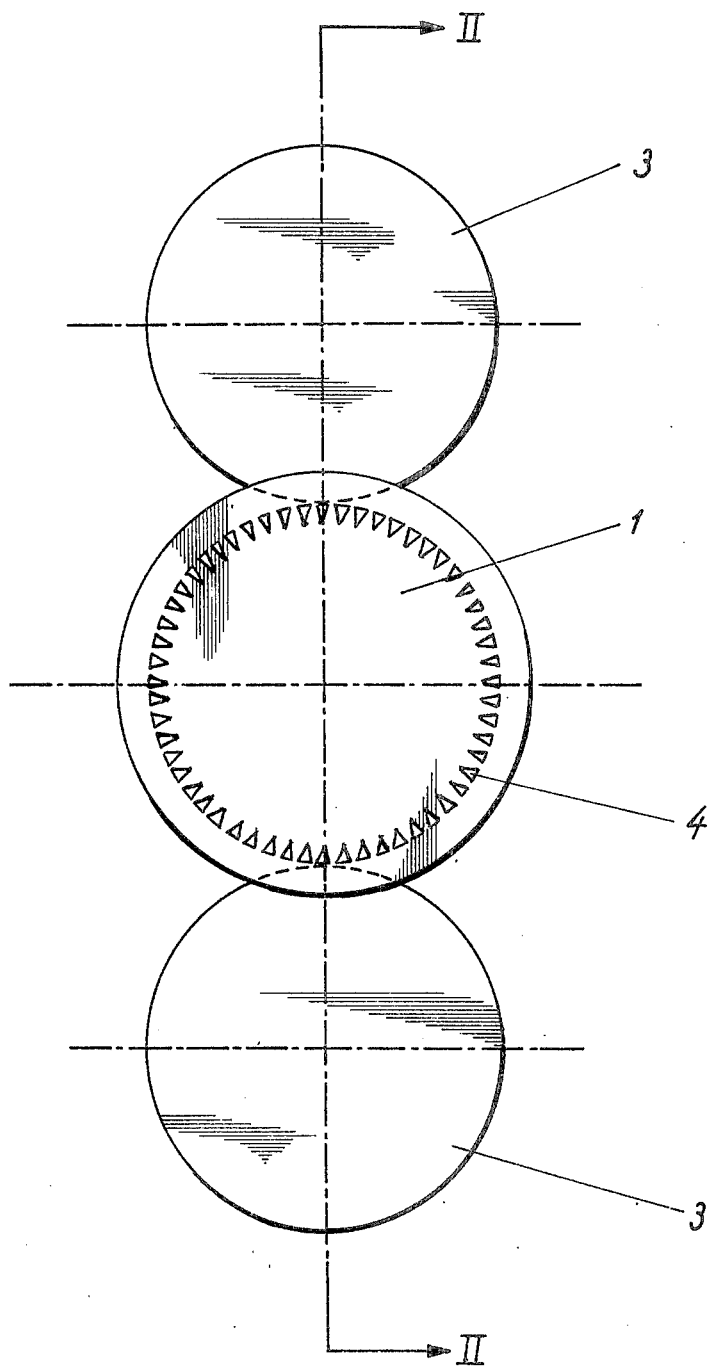

United States Patent [19]

Bruun

[11] 4,018,149
[45] Apr. 19, 1977

[54] PRESS FOR PRODUCTION OF A DRY FODDER

[76] Inventor: Bjorn Adler Zeuthen Bruun, Majlund, 9870 Sindal, Denmark

[22] Filed: Oct. 21, 1974

[21] Appl. No.: 516,741

[30] Foreign Application Priority Data

Oct. 22, 1973 Denmark ............................ 5726/73
Jan. 29, 1974 Denmark ............................ 448/74
Oct. 8, 1974 Denmark ............................ 5254/74

[52] U.S. Cl. ................................ 100/160; 100/35; 100/176; 100/DIG. 4; 100/DIG. 6; 425/DIG. 230

[51] Int. Cl.² ...................... B30B 3/04; B30B 3/06; B30B 11/12

[58] Field of Search ............... 100/DIG. 4, DIG. 6, 100/DIG. 7, DIG. 9, 155, 160, 177, 176, 178, 35; 425/DIG. 230, 294, 310, 311, 363, 382, 382.2, 193; 56/1 R

[56] References Cited

UNITED STATES PATENTS

| 2,177,132 | 10/1939 | Crabtree | 100/DIG. 6 |
| 3,174,441 | 3/1965 | Lundell | 425/DIG. 230 |
| 3,905,737 | 9/1975 | Lely et al. | 425/DIG. 230 |

FOREIGN PATENTS OR APPLICATIONS 256,573 4/1970 U.S.S.R. ...................... 100/DIG. 6

*Primary Examiner*—Peter Feldman
*Attorney, Agent, or Firm*—Burgess Ryan and Wayne

[57] ABSTRACT

A press for dry fodder comprising a cylindrical matrix which is provided with a radially extending flange extending at right angles to the rotational axis of said matrix and an annular circumferential stepped portion on said matrix in which rotates at least one press wheel. Axial cutouts connecting said stepped portion to a side of said matrix are provided for pressing and discharging said material.

16 Claims, 22 Drawing Figures

PRESS FOR PRODUCTION OF A DRY FODDER

The application relates a press for production of a dry fodder from a voluminous vegetable material and a press for performance of the method.

The known methods of production of fodder pills suffer from the undersirable feature, that excessive quantities of energy must be supplied to transform the voluminous raw material into a pill, which is due to the fact, that the raw material is not compressed sufficiently and, therefore, is not subjected to pass the elastic limit. The object of the invention is to remove this drawback undesirable feature, and is achieved by exposing the material to such a heavy compression, that the material passes the elastic limit, and in this condition is led through an opening, to form the fodder.

By this procedure a method is provided for production of a new and very suitable dry fodder, which is connected with the opening of the raw material caused by the high pressure and the rise in temperature. Especially as far as straw is concerned this means, that the binding of cellulose to the indigestible ligning is neutralized, by means of which the digestibility is doubled.

By using the press according to a first embodiment of the apparatus for performance of the method, the necessary pressure is achieved in a simple manner, as this construction of the press possesses a suitably high counterpressure that is, it is easy to feed the press, since it pulls in the material itself.

By using a press according to a second embodiment a compact construction is achieved, which may be built together with other presses for the purpose of increasing the capacity of the press, just as the size of the parts may be adapted to each other, so that the production costs may be reduced.

The construction according to a third embodiment ensures complete synchronization of wheels incorporated thereon. According to a fourth embodiment the ejection of the material is secured. By means of a construction according to a fifth embodiment a very compact press can be constructed, while according to claims further embodiments the press can be adapted to various types of materials.

In an additional variation of the invention the press is constructed of parts in such a manner that worn parts may easily be replaced, while a wedge can scrape the press wheel clean during the operation and prevent material from falling out. Discharge openings may be provided are for the outflow of sap from the material.

For use in a reciprocating driving mechanism the press according to the invention is very suitable, as only little power is needed for compressing the material. In one embodiment the construction is, suitable for installation on a pick-up.

To convey a material sufficiently fast to the press from the head, a feed device both conveys the material and prepresses it.

Figure 2:
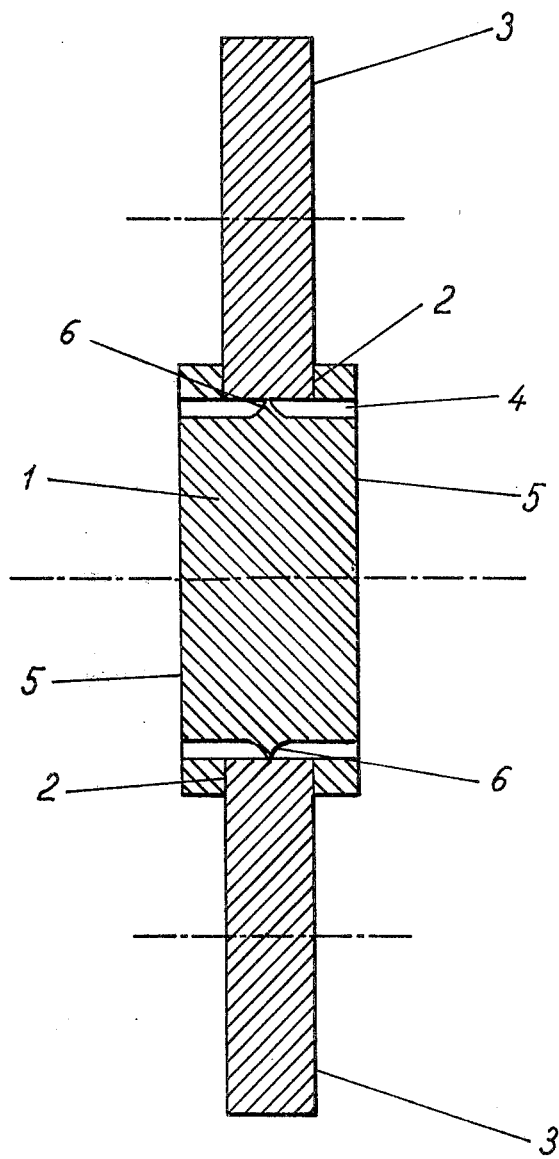
Figure 3:
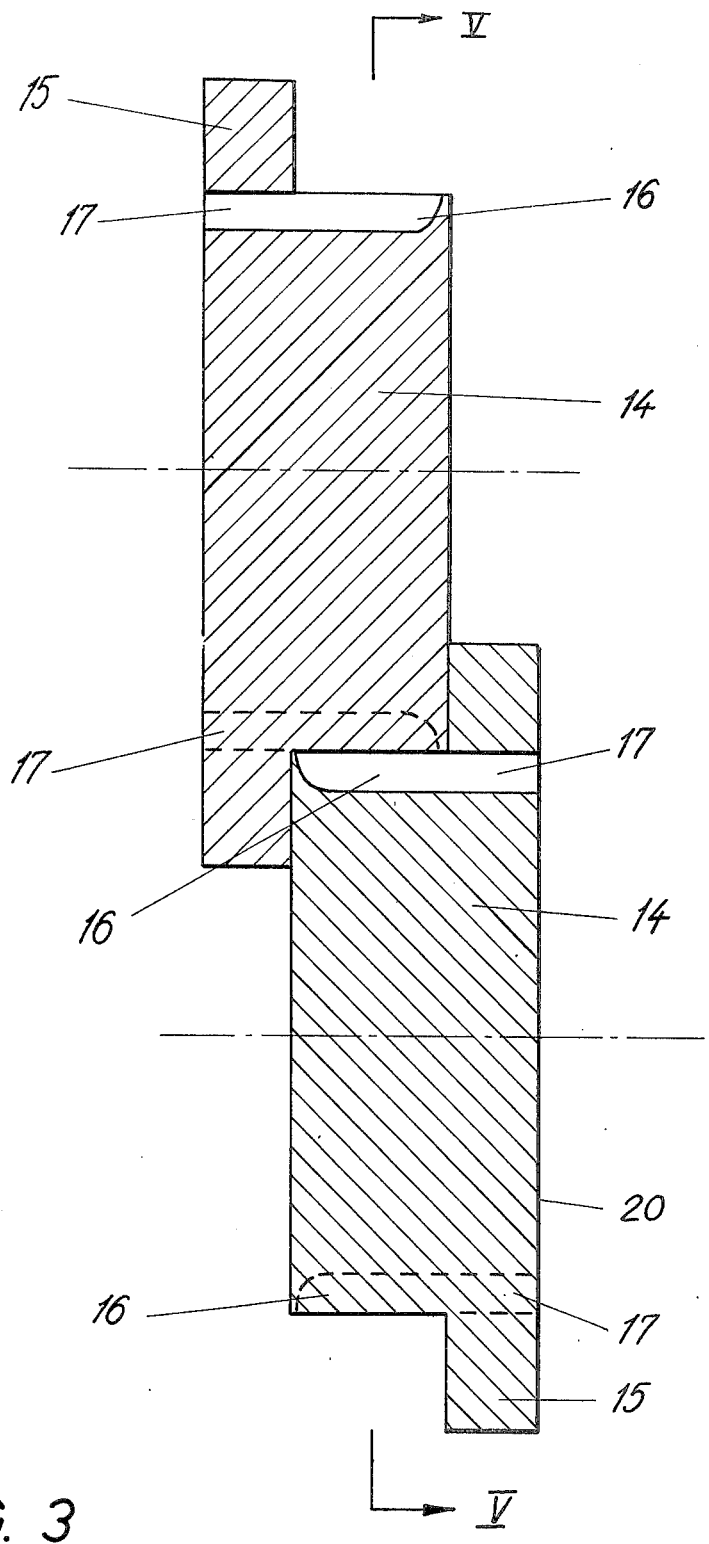
Figure 4:
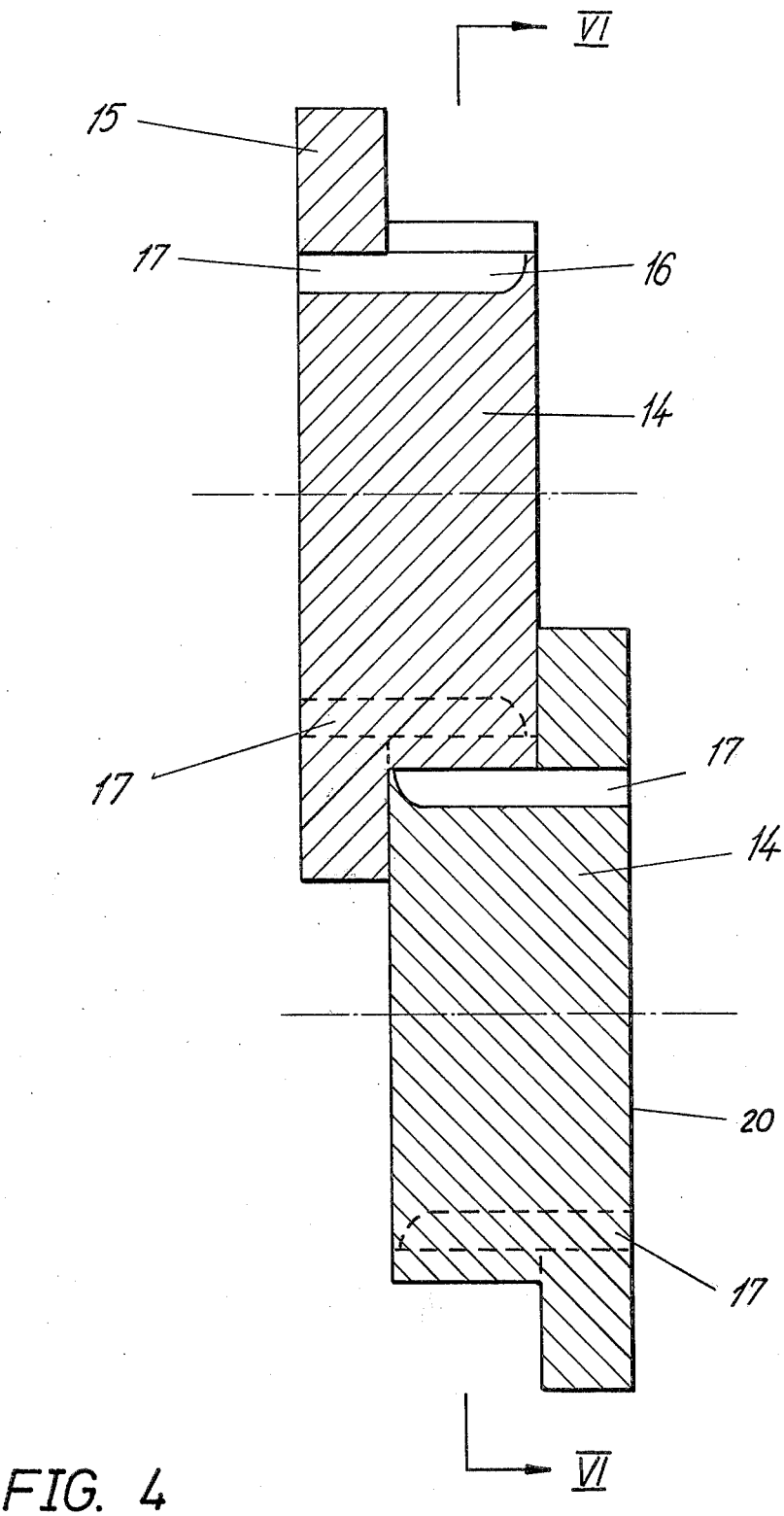
Figure 6:
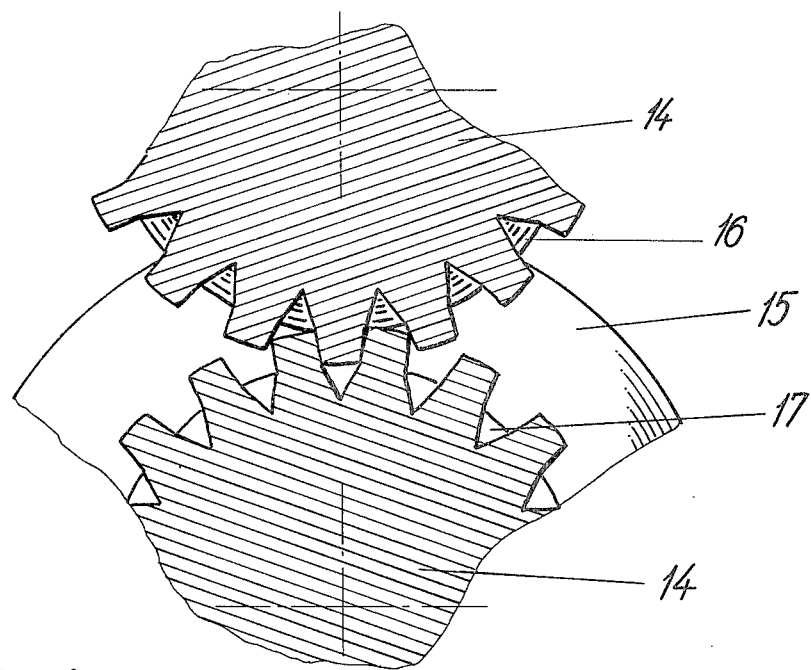
Figure 5:
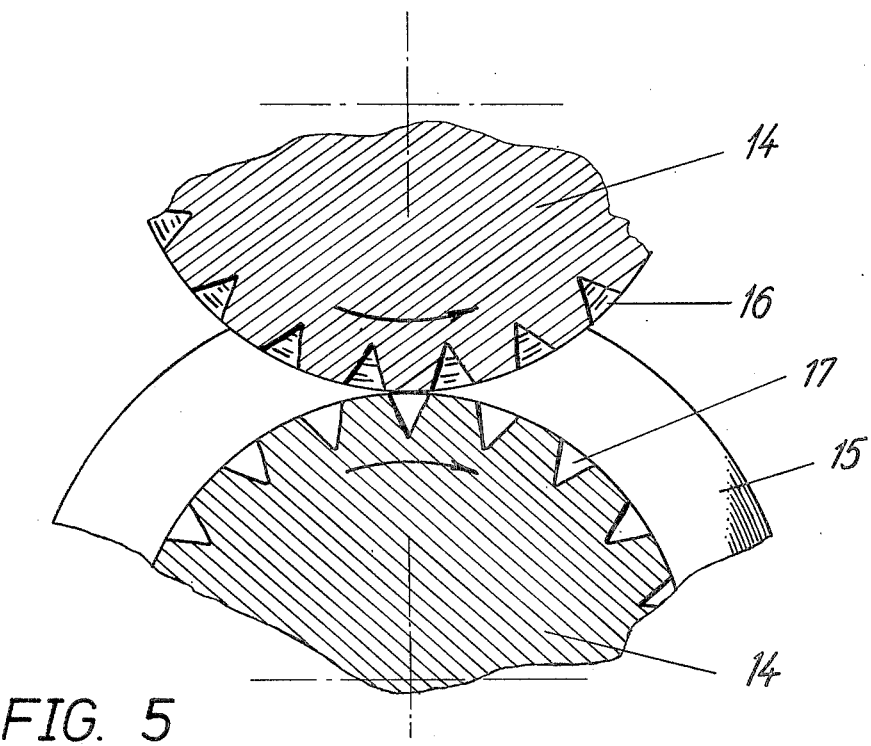
Figure 7:
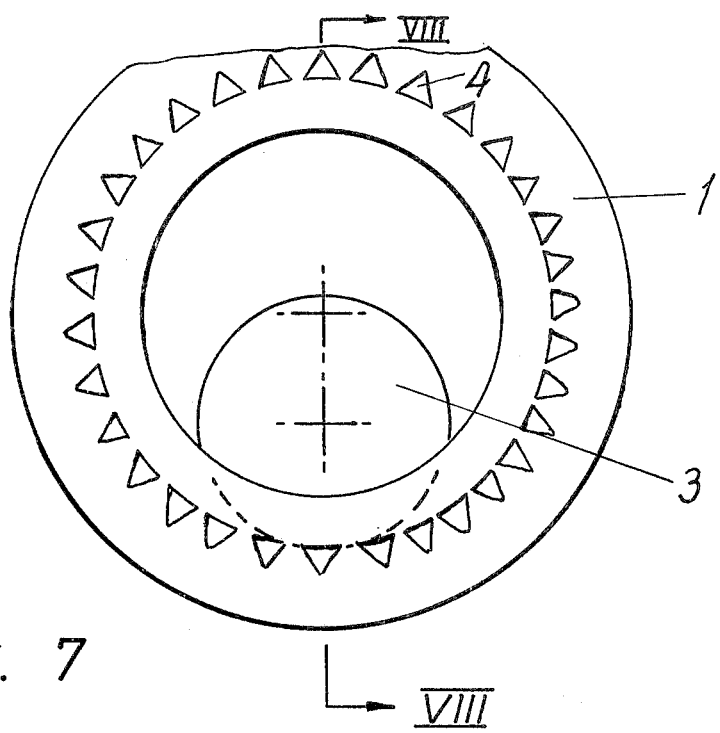
Figure 8:
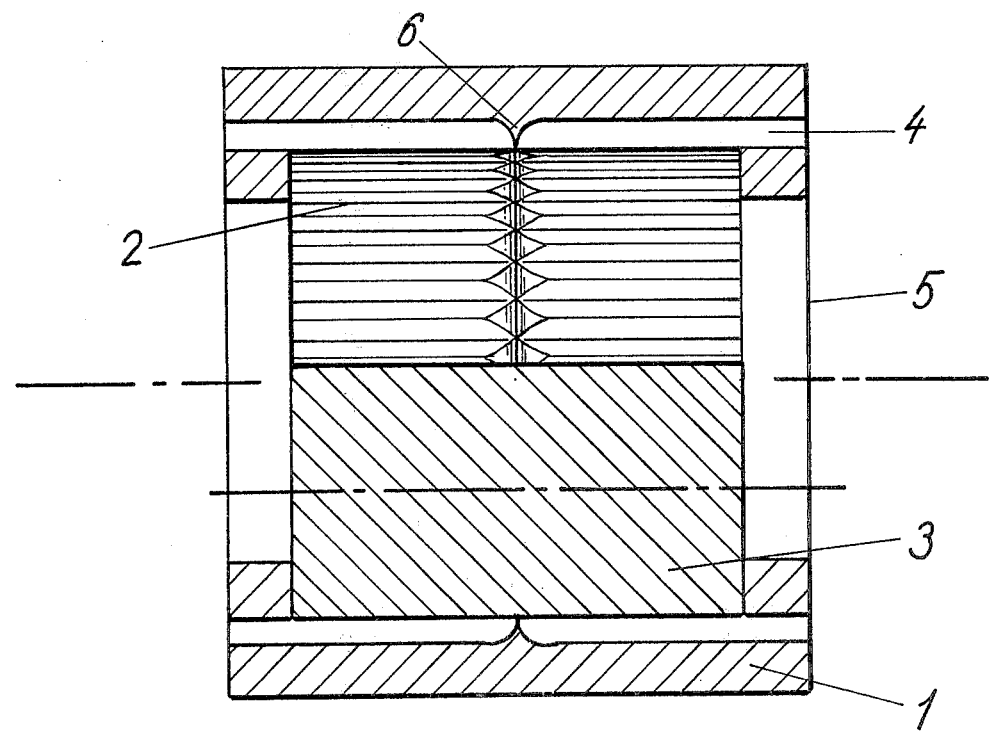
Figure 9:
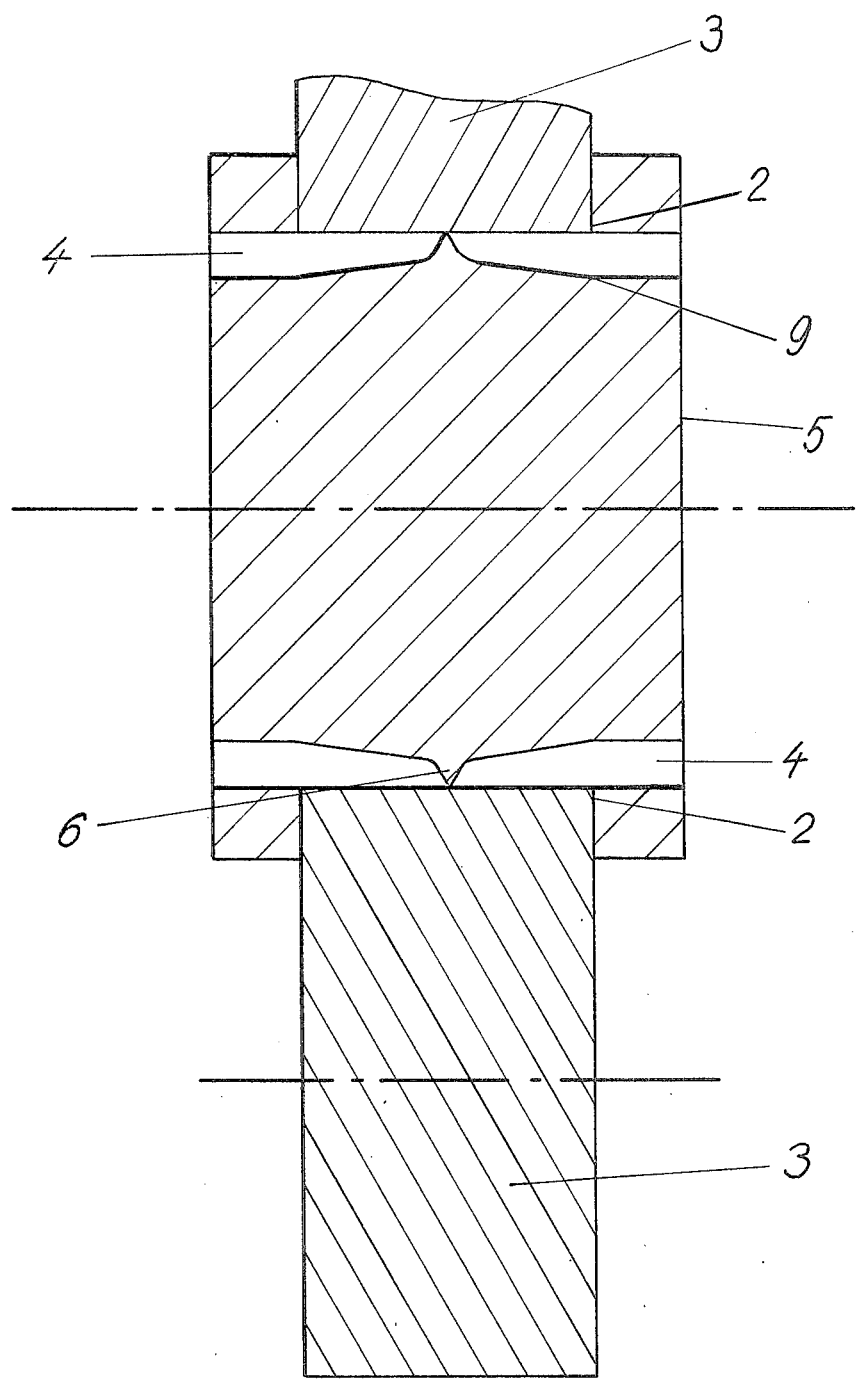
Figure 10:
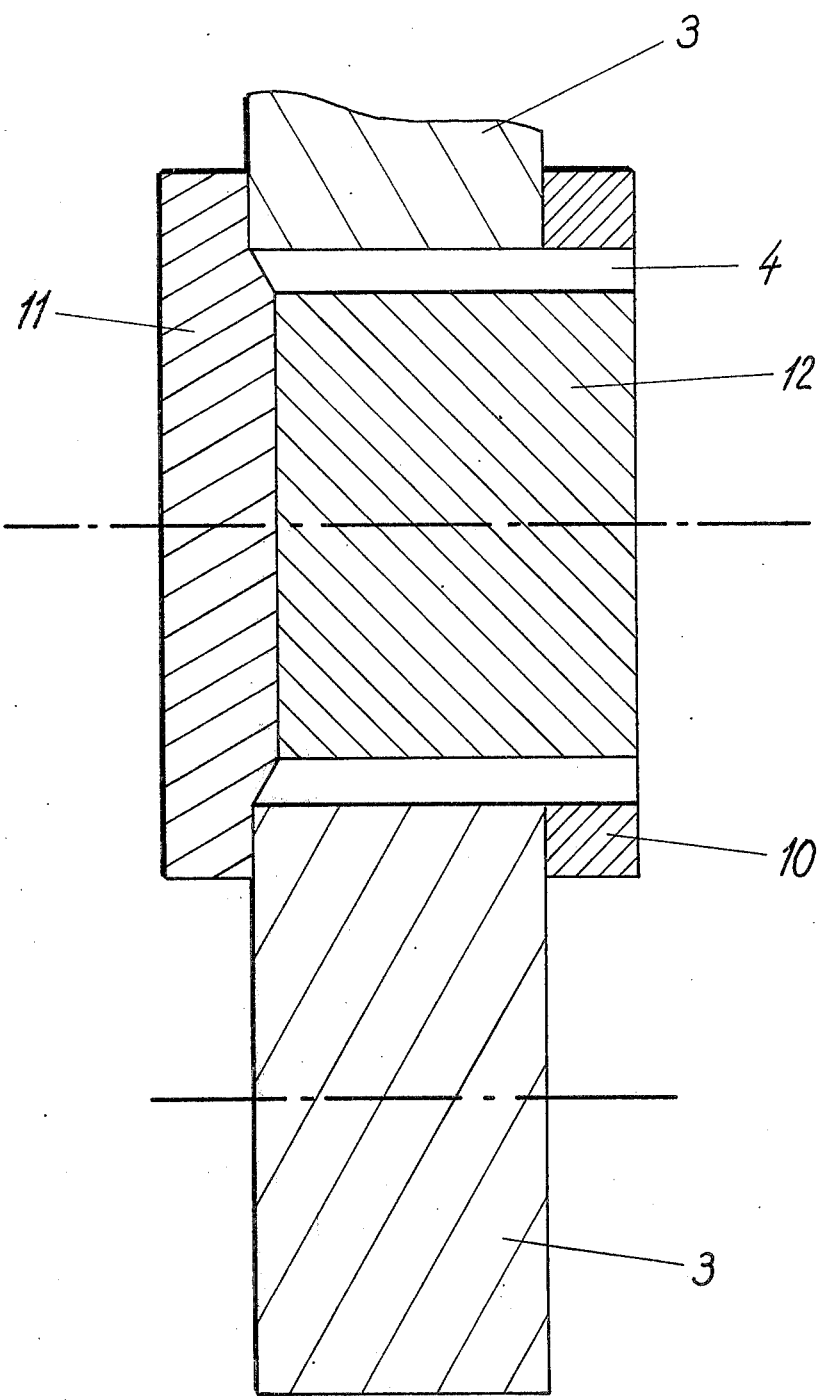
Figure 11:
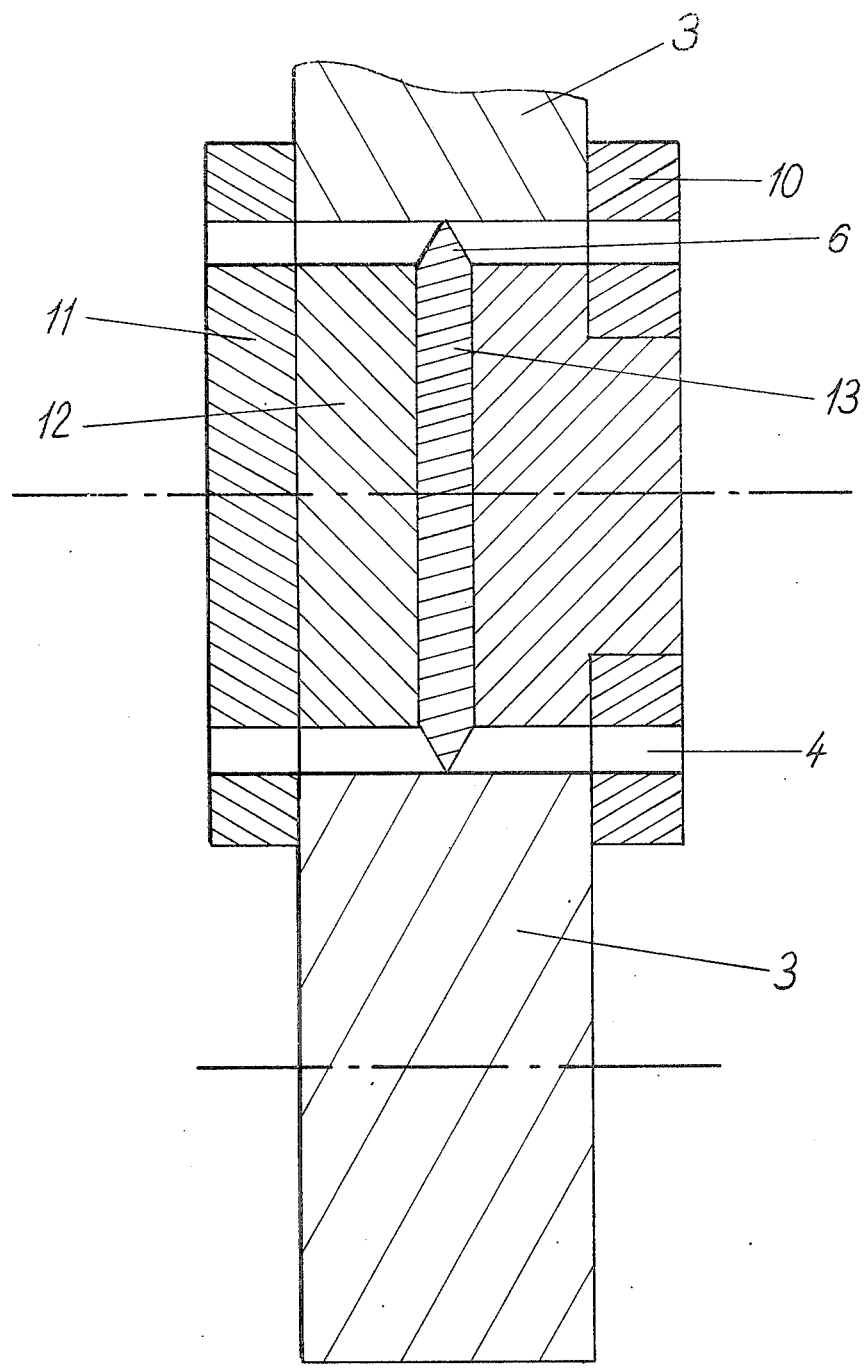
Figure 12:
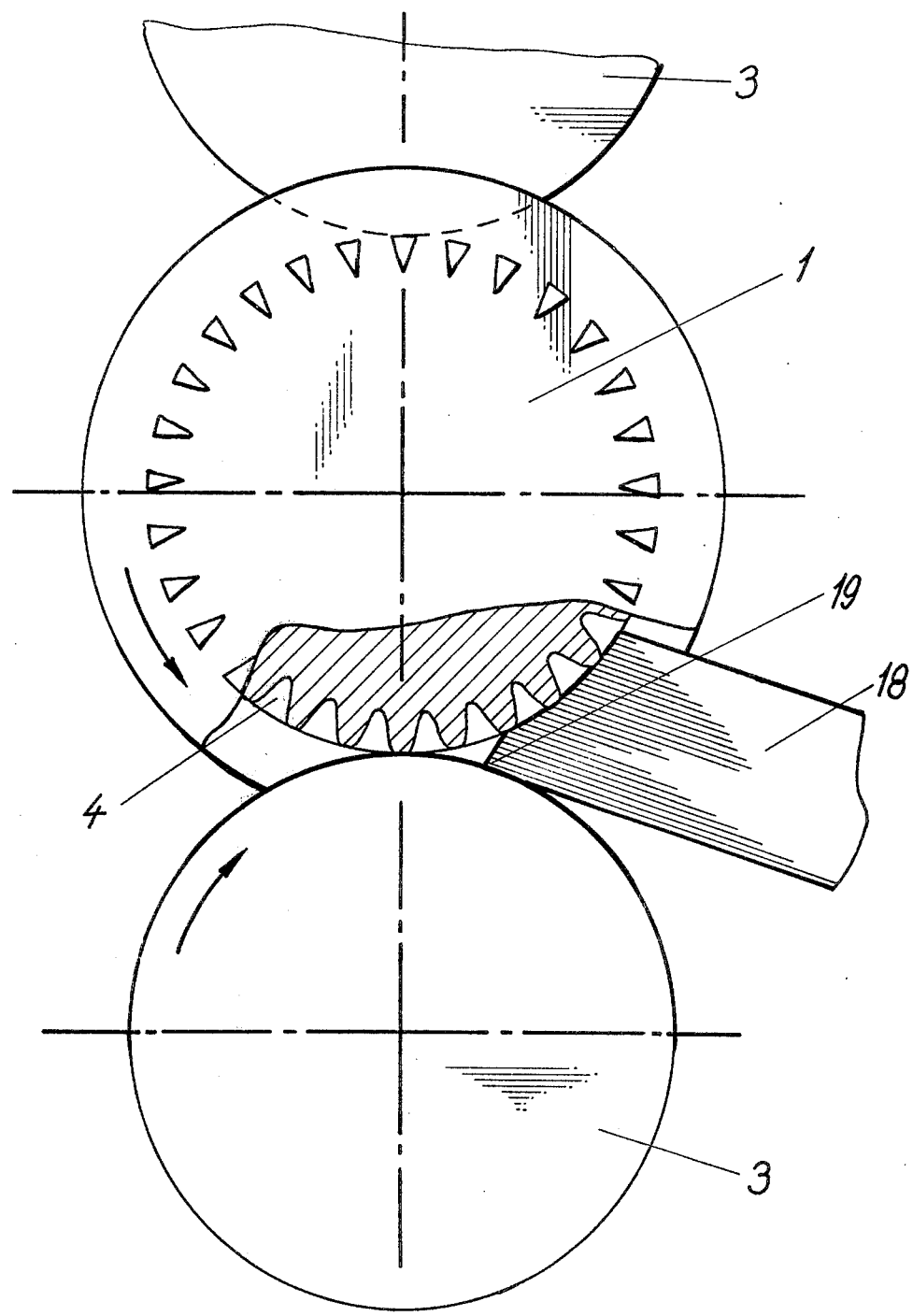
Figure 13:
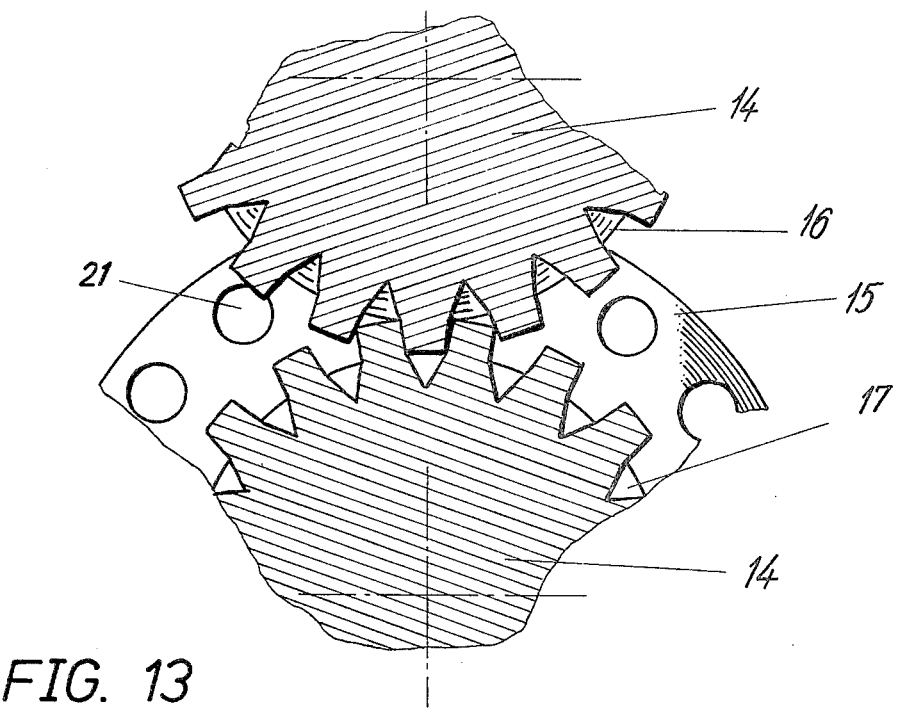
Figure 14:
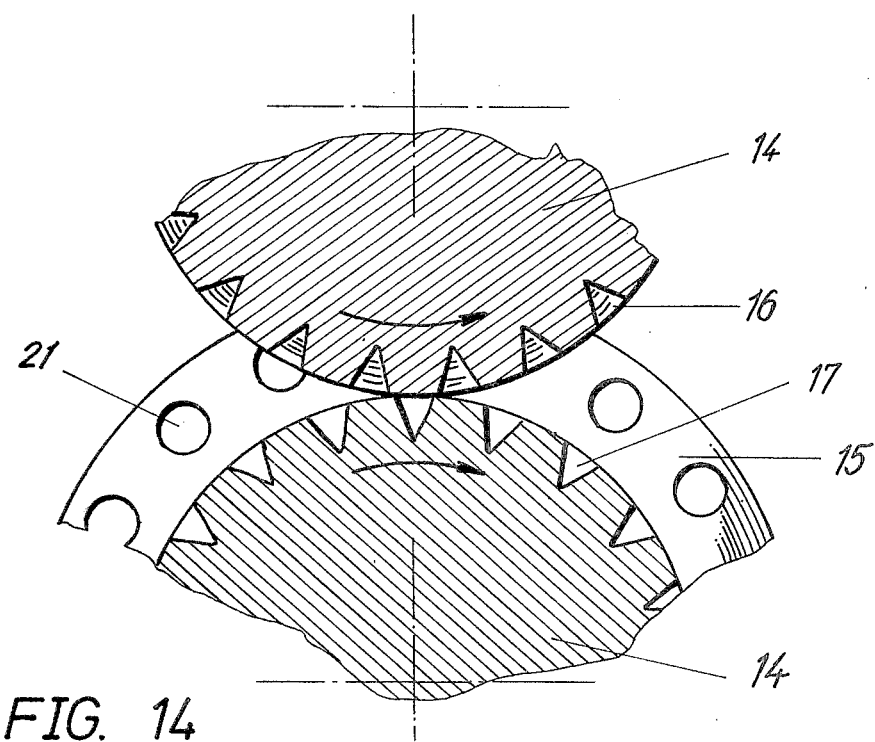
Figure 15:
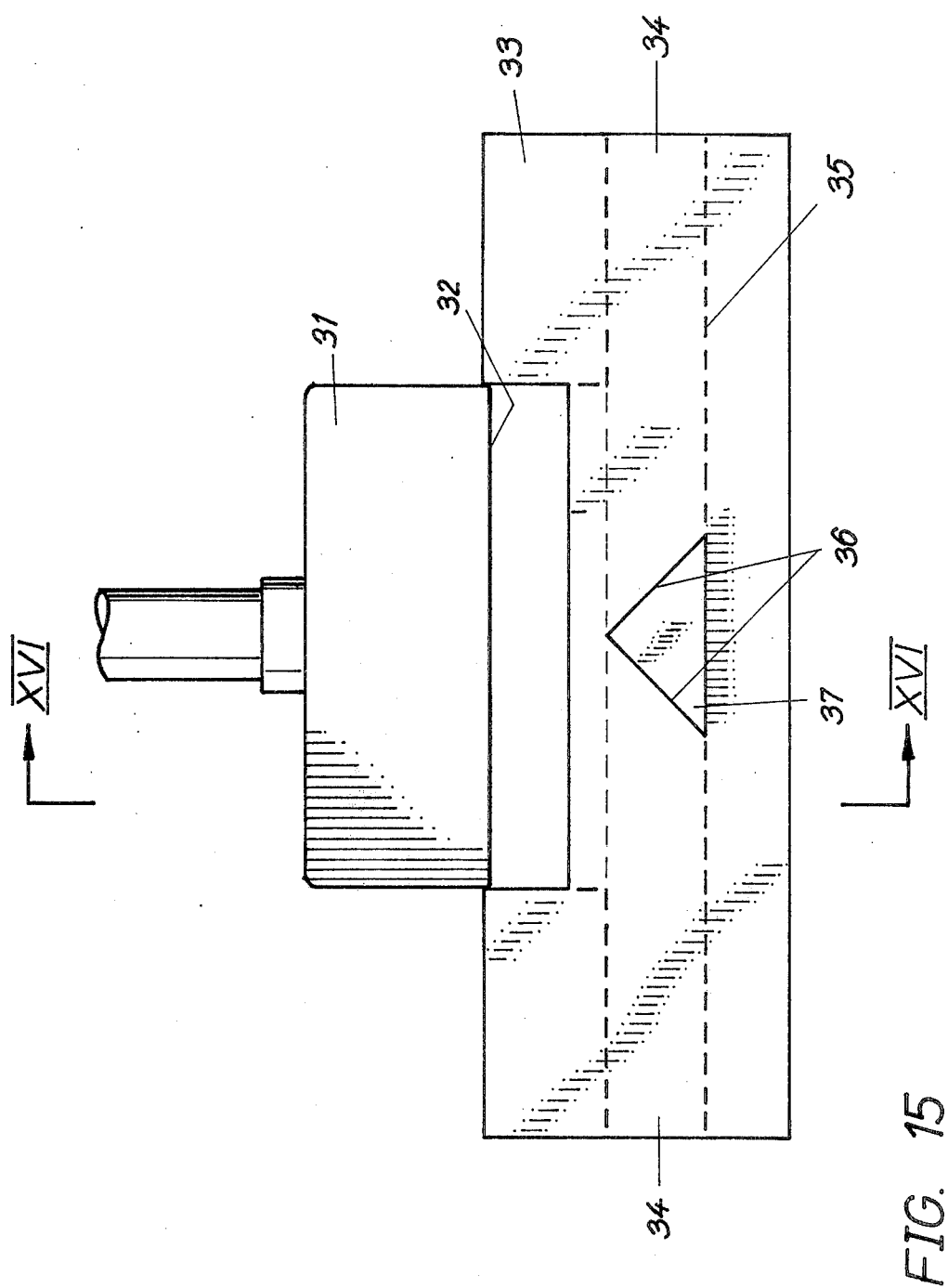
Figure 16:
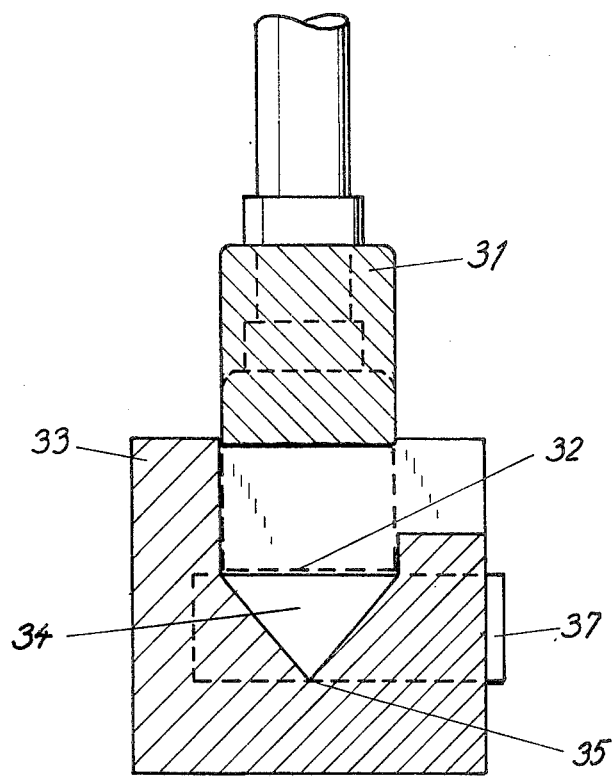
Figure 17:
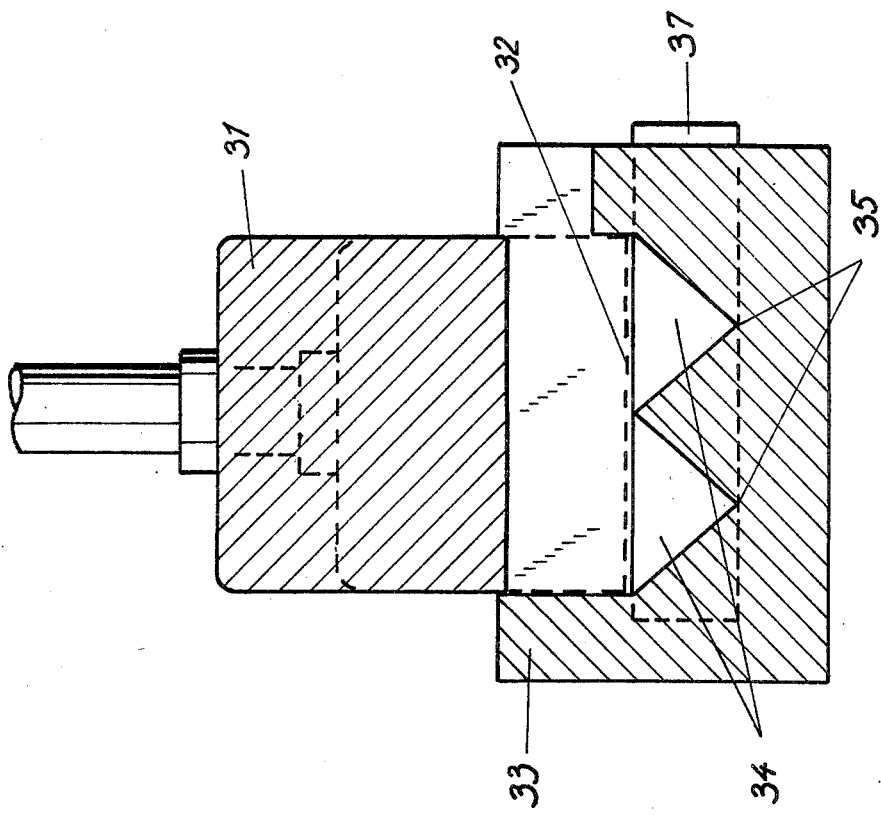
Figure 18:
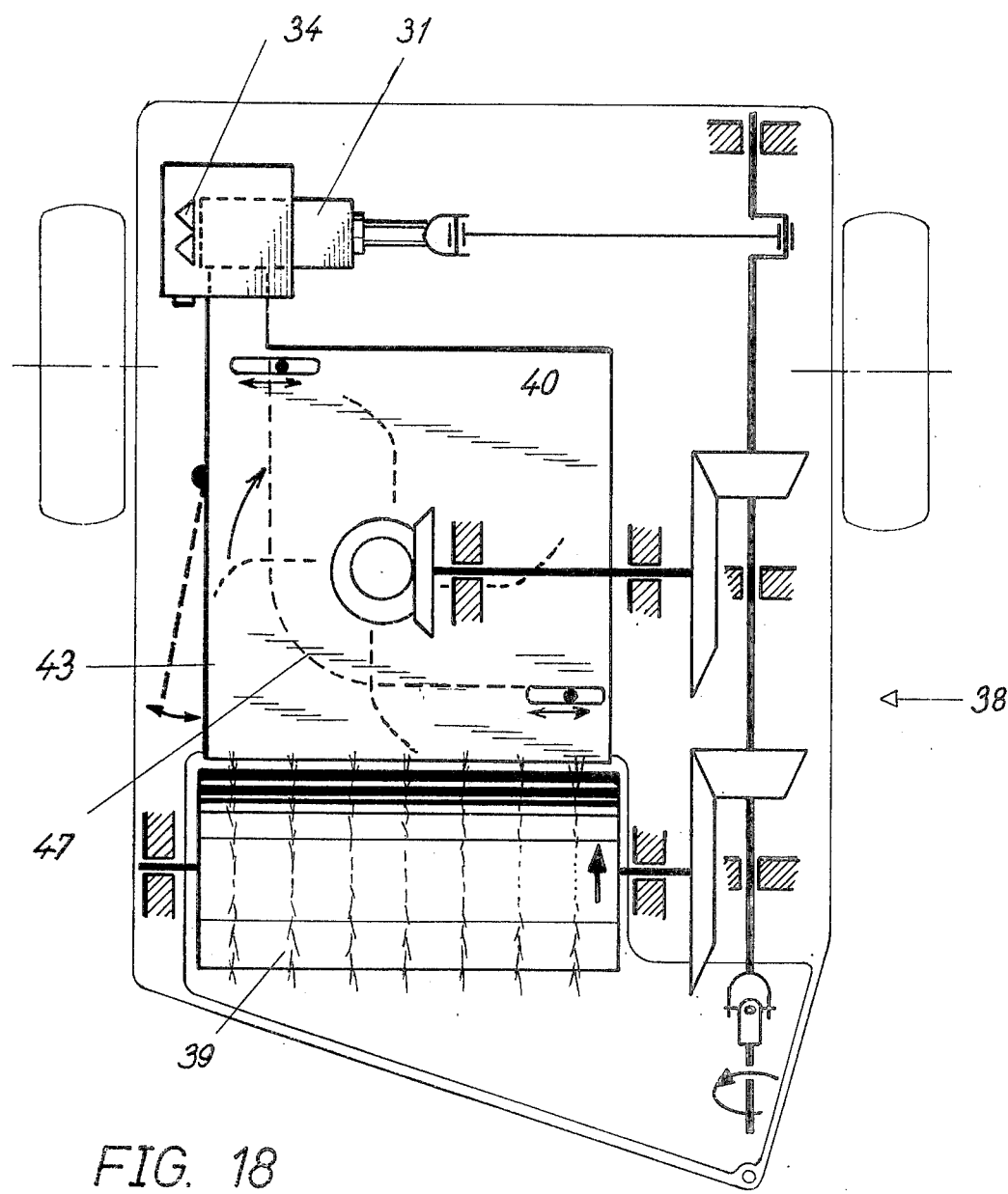
Figure 19:
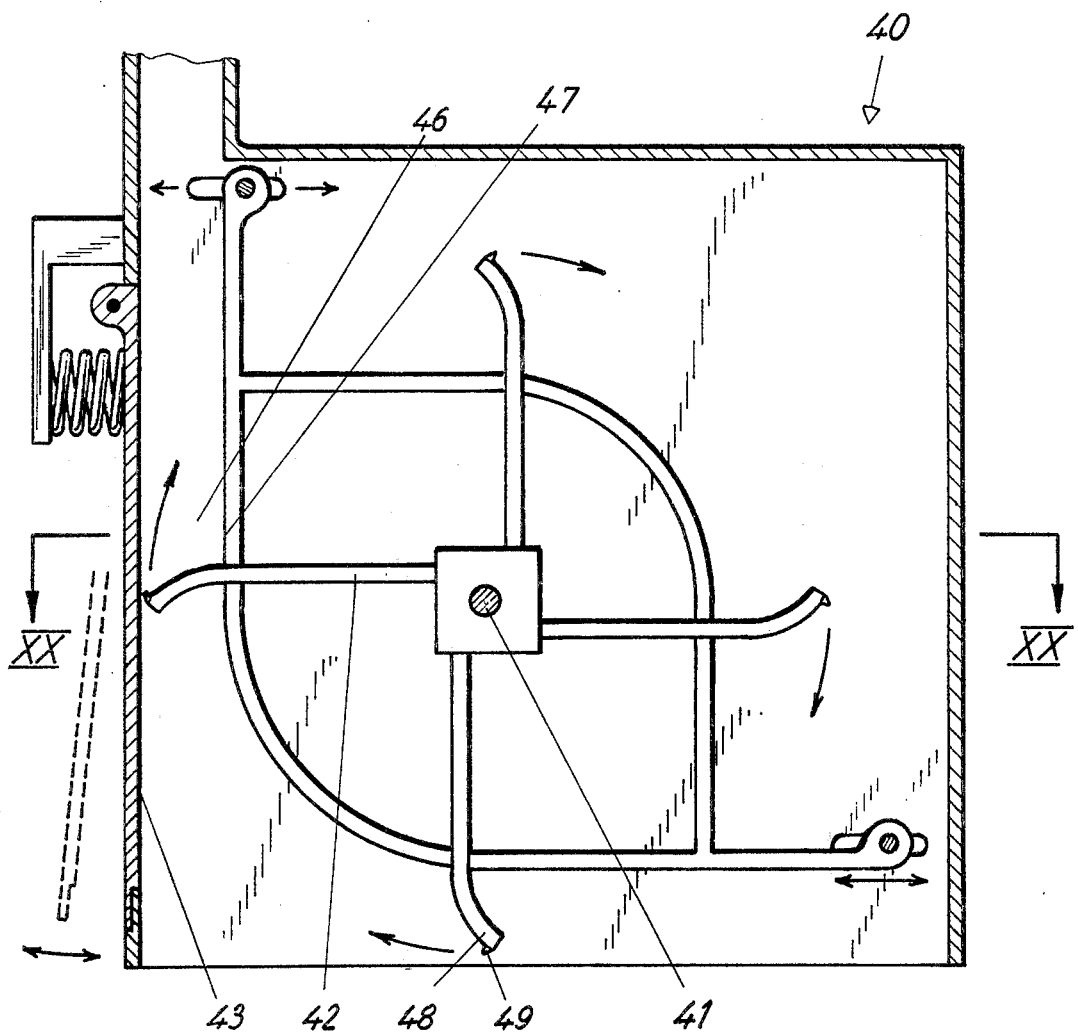
Figure 20:
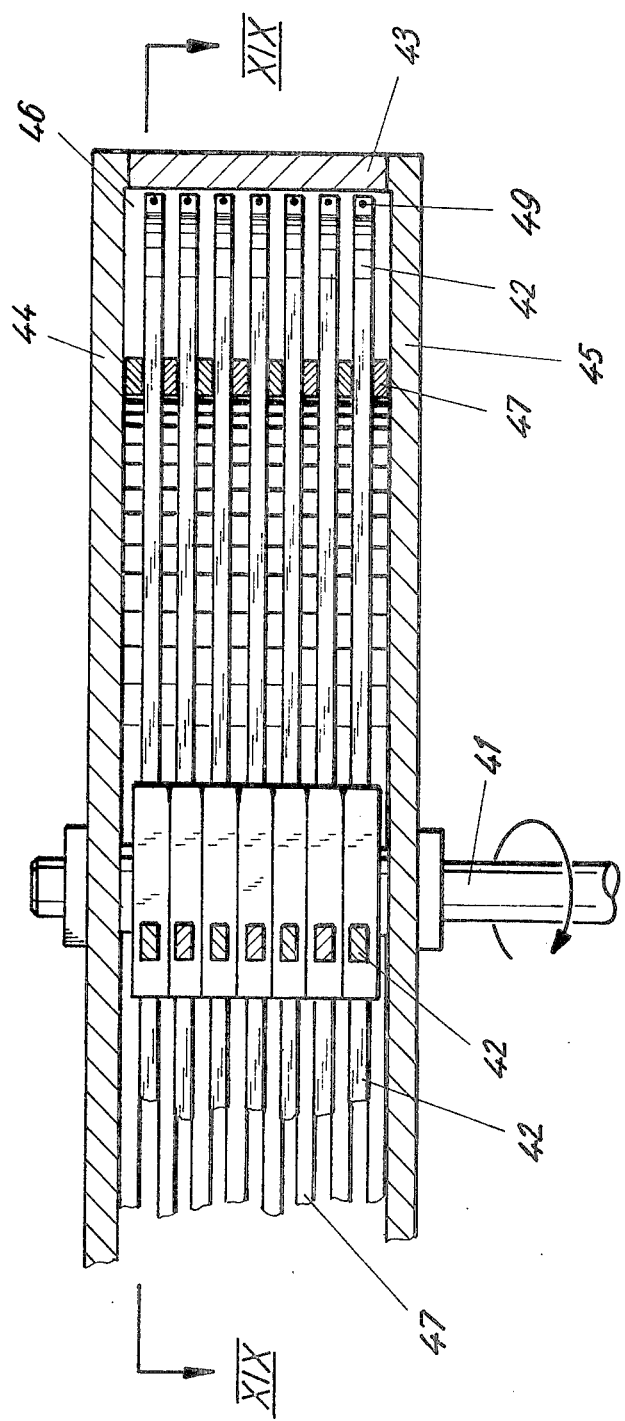
Figure 21:
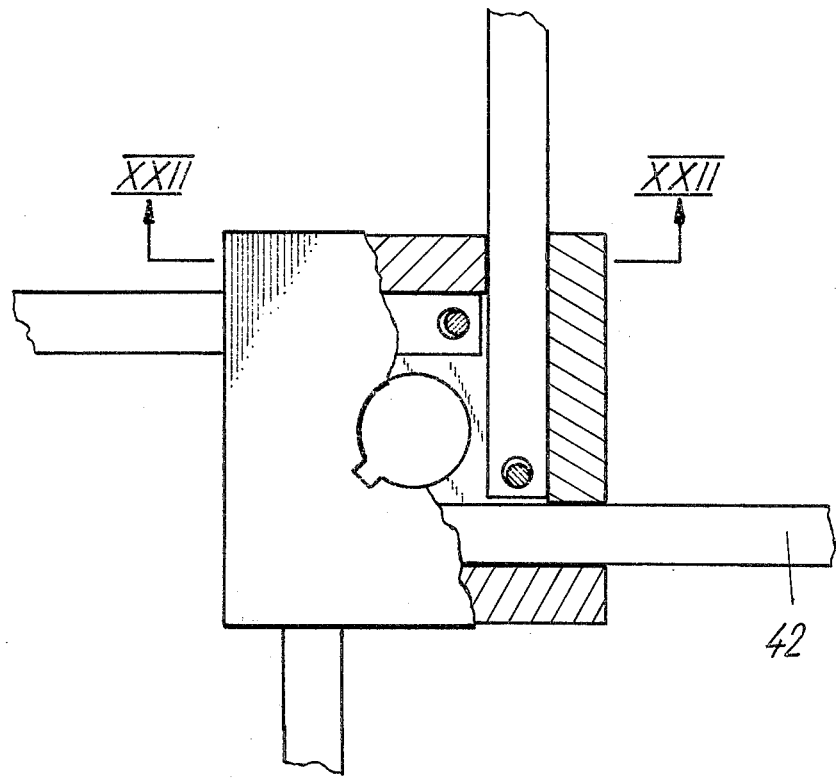
Figure 22:
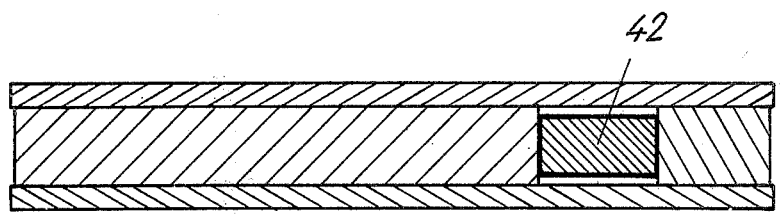

The invention will be described in details below with reference to the drawing, in which FIG. 1 shows a press in side elevation, FIG. 2 shows the press as viewed on section II—II in FIG. 1, FIG. 3 shows press constructed of two wheel viewed in section, FIG. 4 shows the two wheels meshing, FIG. 5 shows a section V—V in FIG. 3, FIG. 6 shows a section VI—VI in FIG. 4, FIG. 7 shows a sectional view of a modified embodiment, FIG. 8 shows a section VIII—VIII in FIG. 7, FIG. 9 shows a section of a press with special cutouts, FIG. 10 shows a section of a press with one-sided discharge, FIG. 11 shows a section of a press constructed of parts, FIG. 12 shows a press with a wedge, FIG. 13 shows a sectional view of a press with discharge openings, FIG. 14 shows another press with discharge openings, FIG. 15 shows a reciprocating press in side elevation, FIG. 16 shows the press in section on the line XVI—XVI in FIG. 15, FIG. 17 shows the same sectional view of a press with two channels, FIG. 18 shows the press and the feed mechanism installed on a pick-up, FIG. 19 shows the feed mechanism viewed on section XIX—XIX in FIG. 20, FIG. 20 shows the feed mechanism viewed on section XX—XX in FIG. 19, FIG. 21 shows a detail of the feed mechanism and FIG. 22 shows a section of the detail viewed in the direction XXII—XXII in FIG. 21.

The press which will be dealt with below is illustrated in FIGS. 1 & 2. The matrix consists of a body, which is at its middle along the circumference provided with a stopped portion 2, in which rotates at least one press wheel 3. The press wheel 3 is compression stressed against the matrix, round a fixed axis, which provides for the material being pressed down into some cutouts 4. The cutouts 4 are located in the matrix 1 along a circle with same radius. The cutouts 4 extend from the sides of the matrix to the stepped portion 2. In the middle of this cutout may be located a partition 6, which divides the flow of material to each side of the matrix.

On one or both sides of the matrix 1 may be mounted cutting devices, not shown which can cut the flow of compressed material through the cutouts into suitable pieces as required.

The voluminous material, as e.g. straw and grass, is supplied to the press in using two press wheels 3, as shown in FIG. 2, suitably from two sides, where the matrix 1 and the press wheel 3 converge. The material is caught by the rotating parts and pulled into the cutout 4, where it is exposed to such a high pressure that the elastic limit is passed.

In this state the material is driven out through the openings of the cutouts on the side of the matrix in the shape of bars.

It may then be cut in suitable lengths as required.

The embodiments of the press, which will be dealt with below, as shown in FIGS. 3 - 14.

As appears from FIG. 3 the press consists of two wheels 14 with a flange 15 on one side.

Each wheel is provided with a number of cutouts 16 along the circumference, which cutouts extend through the flange 15 and form discharge openings 17. These wheels must be caused to roll on each other by means of rotating means, just as there must in this construction be provided external means, e.g. in the shape of toothed gears for synchronization of the rotation of the wheels.

By making the wheels mesh with each other, as will be seen in FIGS. 4 and 6, a correct synchronization of the wheels is ensured, by means of which the aforesaid external means can be eliminated.

When such wheels with identical width roll on each other, material introduced from the side, will be caught by the teeth and led into the cutouts, by means of which the material, with the wheels rotating in the direction of the arrows will be compressed beyond the elastic limit and ejected through the discharge openings 17 at both sides 20 of the press.

This special design of the wheels renders it possible to increase the number of wheels to an unlimited extent, as they must in such case be mounted for rolling on the other wheels.

The number of pressings may hereby be made very large, and the production costs may be limited considerably, as the press can be constructed of identical wheels.

Another embodiment is seen in FIGS. 7 and 8. The matrix 1 is hollow and internally provided with cutouts 4. Inside this matrix a press wheel is rolling so that a material introduced from the side is pressed down into the cutouts and until it passes the elastic limit, after which it is discharged through the discharge opening of side 5.

Both in this embodiment and that shown in FIG. 2 the matrix may be stationary so that the press wheels 3 are made rotate and roll on the matrix over the cutouts 4.

It may in certain cases be necessary to modify the cross sectional area of the cutouts 4. As shown in FIG. 9 the cross section area may be increased towards side 5 of the matrix, which will facilitate the ejection of the dry fodder considerably.

This cross sectional modification may be provided e.g. by making the bottom of the cutouts slope towards the ejection side, which will promote the ejection.

In front of the stepped portion 2 the cross section area may be constant until the discharge opening, by which a homogenous finished product is achieved.

If the driving off takes place too easily the pressure in the cutouts becomes too low. It may, therefore, be necessary to reduce the cutout at the discharge opening.

By giving the discharge openings different cross sectional shapes, the finished fodder can be given different cross sections, as e.g. square, oval and round.

The matrix may, as will be seen in FIG. 10, be closed at one side.

This will simplify the cutting of the dry fodder into pieces and the collection of the finished product.

The matrix may furthermore suitably be assembled of work pieces, as illustrated in FIG. 11.

This construction renders it possible to change the capacity of the press, the cross section shape of the finished product, the ejection side etc. by simple means.

By placing a disk 13 with a rib 6 along the circumference division of the cutouts 4 is achieved by simple means.

Instead of a disc 13 may be placed a ring not shown, forming a rib 6 along its circumference.

It may in certain cases be necessary to scrape the press wheel 3 clean during the operation. One can, therefore, as will be seen in FIG. 12 place a wedge 18 with a scraping edge 19 against the surface of the press wheel to form a pressing surface.

In order to prevent the pressed material in the cutouts 4 from falling out, the wedge may be enlarged and adapted to the matrix, or a separate rounded detention fender may be used.

These means may naturally be extended to cover the entire area of the matrix, in which there are cutouts laid free so that the material can be ejected through the discharge openings on the sides of the matrix.

In FIG. 13 and 14 is illustrated a press, which is particularly fit for compression and driving off of sap from a voluminous raw material, as there are arranged discharge openings 25, through which the driven off sap can escape, while the compressed residual product will be ejected through the discharge openings 17 in the usual manner.

The raw material may e.g. be a material as straw and hay, turf, sawdust, grass, leaves and like vegetable materials.

The driven off vapor may be distilled into a very high protein product, which may be used in the food industry.

The press may advantageously be used for other purposes than for production of dry fodder and possibly driving off of sap, as it can on account of its construction be adapted to compression of a great many different materials.

The press etc. dealt with below is shown in FIGS. 15 – 22.

The press shown in FIGS. 15 – 17 consists of a matrix 31 and a matrix 33. The matrix has in the shown embodiment a square pressing surface 32 and is arranged for being moved reciprocatingly by a driving mechanism.

The matrix is provided with one or more channels 34 with a V-shaped cross section. The channel may pass as a through-going chute, as shown in the figures, as there is then at the middle of the chute placed a delimination in the shape of a bar 37, which divides the channel in two parts and forms an oblique delimination surface 36, which can lead the material out against the discharge opening of the matrix on the side. Furthermore the matrix is provided with a supply opening for the material, so that it can be led in under the pressing surface 32 of the matrix in its retracted position. when the patrix is led forwards with the bottom position at the upper edge of the channels, shown in dotted lines in FIGS. 15 and 16, the material is pressed down into the channels 34, where it is subjected to pass the elastic limit and is, on account of the oblique surfaces 36, lead out through the discharge openings in the form of a finished dry fodder.

The press may be provided with one or several channels 34 according to the capacity of the press desired. The channels may be through-going as shown in the figures or they may be one-sided with a delimination 6 similar to that shown in FIG. 2 at the bottom which will mainly be situated opposite to the one end edge of the patrix.

By means of this construction of the matrix with one or more channels of the special V-shape type a dry fodder can be produced which is very well fitted for feeding purposes with a much smaller power consumption in proportion to other presses of this type. The channel shape ensures a uniform product, as the pressing forces are distributed evenly over the entire upper channel, and as the walls of the channels slope inwardly, some inwardly directed forces are produced by the movement of the piston downwards against the bottom position, which ensure that materials are compressed on the entire cross section. The compressed dry fodder is, therefore approximately homogenous, and its triangular cross sectional shape is fit for a dry fodder of this type. To this is added the exceptionally low power consumption required for compression, owing to the appropriate channel shape.

The bar 37 is shown as a detachable metal bar, which may be replaced as desired. If a hard object as a stone is led in together with the voluminous material, it may cause fracture of the bar, which must therefore be replaced. This replaceable bar makes this repair very simple and inexpensive.

The low power consumption of this press makes it, as previously mentioned, very fit for installation on a pick-up. The problem is here to have the material, which the pick-up head lifts from the ground, led continually into the pressing chamber. This problem has been solved by means of the feed mechanism, which will be deal with below with reference to FIGS. 18–22, In FIG. 18 the pick-up is shown in top view in a principle and consisting of a generally known pick-up head 39 located at the front edge of the pick-up 38. The pick-up may be pulled by a usual tractor by means of known connecting members, which will not be mentioned further. The driving-power for the pick-up may be taken from the power take-off of the tractor, which may be connected to the head 39, the feed mechanism 40 and the press 31–37 in any suitable manner.

The feed mechanism 40 consists of a casing, in which is mounted a drive shaft 41, which is rotated. Some guide arms 42, e.g. as shown here four arms, are fastened to the shaft 41 by means of connecting fittings, shown in FIGS. 21 and 22. To secure a certain movability between the arms 42 and the shaft 41, each arm may be fastened to a form of connecting fittings by means of a pin about which each arm catches loosely in a hole. As will be seen from FIG. 22 there are a couple of gaskets around each set of guide arms 42, located at a distance from the arms by means of spacing blocks, so that the arms can move longitudinally during their rotation. At the same time this construction permits a very easy replacement of guide arms in case of damage to them.

Each guide arm 42 consists of a piece of bar material with a curved bend at the extreme end, as shown in FIG. 19. This bend increases the catching capacity as it ensures an even conveyance of material through the mechanism, as will be described later on.

Outermost on the front side of the arms is located a projection 49, to prevent the material from sliding off the arms during the conveyance. Instead of a bar material arms made of a plate material, may be used. Instead of a bend, the plate is cut obliquely at the extreme end. The feed mechanism is shown on section in FIG. 20. It appears that several layers of arms are fastened to the shaft 41 so that between each layer there is space for a frame which forms a wall 47 in a feeding channel 46, as will be seen in FIG. 19. This feeding channel 46 starts at the discharge side of the pick-up head 39, as illustrated in FIG. 18. It will be advantageous if the guide arms pass near by the fingers of the head 39, as the movement of the material will then be quite continuous and agglomeration may be entirely avoided thereby.

The casing around the feed mechanism forms the upper- and underside of the feeding channel, as will be seen on the section in FIG. 20. The upper side 44 lies close to the upper side of the grill formed by the frame units 47, and correspondingly the underside 45 of the casing rests against the lowest slat 47.

To enable adjustment of the feed mechanism for compression with a pre-pressure suitable to the collected material, this frame construction is made of adjustable slats. In FIG. 19 is seen how the slats are connected through two common tie-bars, which are through-going and which are led in tracks on the upper side and the underside of the casing. These tracks render it possible to reduce the cross section of the feeding channel and thereby to increase the degree of compression. Oppositely an increase of the cross section will reduce the compression.

The endwall 43 opposite to the grill 47 of the channel 37 is furthermore made resilient, as will be seen in FIG. 19 by giving it a resilient stop face against the casing. The object hereof is to protect the mechanism in case of extraneous matter getting into the channel, e.g. turfs may be led in, which will block the channel, as the arms 42–49 cannot quickly decompose the turf. To further protect the arrangement, a pushing of the wall 43 may be used to disengage the drive of the feed mechanism alone or the other parts via a declutching mechanism actuated by the wall 43.

The feeding channel 46 opens into the press, which is mounted at the end of the channel, as shown in FIG. 18. The press may e.g. be operated by a crank, which is operated by the tractor drive. To ensure an even operation a flywheel may be mounted on the crank.

The guide arms lead the voluminous material to the press by striking the pick-up head 39, and lead it down into the channel 46. The bend 48 enables the arms to compress the material in the channel, as the material is prevented from sliding off the arms by the channel walls as well as by the small embossment or projection 49, which keeps the material in front of the arm during its movement down the channel. This construction renders it possible to lead just as much material into the press as the pick-up can lift. As the power consumption is in addition so limited, that a usual tractor can pull both the pickup and the feeding-and press arrangement, this construction make it possible for the first time to produce a very suitable dry fodder in a single operation, by pulling this arrangement over a voluminous material, as it lays on the ground.

I claim:

1. A press for compressing vegetable material beyond the yielding point to produce dry fodder, comprising a cylindrical matrix having at least one radially extending flange with a wall extending at right angles to a rotational axis of said matrix and defining an annular circumferential stepped portion adjacent said wall having a smaller diameter than said flange and rotatable pressing means rotatable about an axis parallel to the axis of said matrix and pressing said matrix in said stepped portion, said matrix having axially extending cutouts connecting an axially extending cylindrical surface of said stepped portion to at least the side of said matrix containing said flange and having a length greater than the thickness of said flange.

2. The press of claim 1 wherein said stepped portion is central of said matrix.

3. The press of claim 2 wherein said cutouts extend to both sides of said matrix, comprising a rib extending radially outwardly into said cutouts.

4. The press of claim 1 wherein said stepped portion is at one side of said matrix, whereby said at least one flange comprises a single flange on the other side of said matrix, said cutouts extending through said flange to form discharge openings, said rotatable pressing means comprising a further matrix of the same shape as said first mentioned matrix and having the same width as said first mentioned matrix, said matrix and further matrix being mounted with the cutouts on said first mentioned matrix being opposite the spaces between cutouts of said further matrix.

5. The press of claim 4 wherein the distance between the axes of said matrices is twice the distance from the axis of each matrix to the surface of the respective stepped portion.

6. The press of claim 4 wherein said spaces between cutouts extend into the stepped portion of the respective other matrix.

7. The press of claim 1 wherein said cutouts are sloping.

8. The press of claim 1 wherein said cutouts have constant depths from a given region to the side of said matrix.

9. The press of claim 4 wherein said cutouts have constant depth in the regions away from said walls.

10. The press of claim 4 wherein the depths of said cutouts gradually deepens away from said walls toward discharge openings defined at the flanged sides of said matrices.

11. The press of claim 1 wherein said matrix is stationary.

12. The press of claim 4 wherein each of said matrices is rotatable.

13. The press of claim 1 wherein said matrix is comprised of a cylindrical work piece having mounting rings for deliminating the recess.

14. The press of claim 1 wherein said matrix is comprised of a cylindrical work piece having a cylindrical disk for deliminating said recess.

15. The press of claim 1 wherein said matrix has a ring defining a rib in said cutouts.

16. The press of claim 1 further comprising a wedge having a scraper edge engaging said rotatable pressing means, said wedge covering the cutouts of said matrix adjacent the place of pressing on said pressing means.

* * * * *

UNITED STATES PATENT OFFICE
CERTIFICATE OF CORRECTION

Patent No. 4,018,149     Dated April 19, 1977

Inventor(s) Bjorn Adler Zeuthen Bruun

It is certified that error appears in the above-identified patent and that said Letters Patent are hereby corrected as shown below:

Column 1, line 54: The comma before "is" should be deleted.

Column 2, line 31: "stopped" should be --stepped--.

Column 5, line 21: "a" should be deleted.

Column 8, line 3: "depths" should be --depth--.

line 13: "recess" should be --stepped portion--.

line 16: "recess" should be --stepped portion--.

Signed and Sealed this

Fifteenth Day of November 1977

[SEAL]

Attest:

RUTH C. MASON         LUTRELLE F. PARKER
*Attesting Officer*      *Acting Commissioner of Patents and Trademarks*